United States Patent
Bushman

[11] Patent Number: 5,511,044
[45] Date of Patent: Apr. 23, 1996

[54] THRUST PRODUCING APPARATUS

[75] Inventor: Boyd B. Bushman, Lewisville, Tex.

[73] Assignee: Lockheed Corporation, Fort Worth, Tex.

[21] Appl. No.: 773,366

[22] Filed: Oct. 19, 1991

[51] Int. Cl.[6] .......................... H04B 11/00; G10K 11/00; F15B 21/12; B64B 1/24
[52] U.S. Cl. ............................. 367/191; 181/0.5; 60/532; 244/53 B; 244/78
[58] Field of Search ............................. 181/0.5; 367/191; 60/532; 417/49; 244/53 R, 53 B, 76 R, 78; 73/505

[56] References Cited

U.S. PATENT DOCUMENTS

| | | | |
|---|---|---|---|
| 4,284,403 | 8/1981 | Rey | 181/0.5 |
| 4,359,962 | 11/1982 | Olsson et al. | 181/0.5 |
| 4,858,717 | 8/1989 | Trinh et al. | 181/0.5 |
| 5,036,944 | 8/1991 | Danley et al. | 181/0.5 |

Primary Examiner—Charles T. Jordan
Assistant Examiner—Theresa M. Wesson
Attorney, Agent, or Firm—James E. Bradley

[57] ABSTRACT

A device for producing thrust has a variety of uses, such as pumping liquid, compressing or blowing air, or powering an aircraft. The device has a chamber with a sound driver located therein. The sound driver creates a compression standing wave in the chamber which will have at least one low pressure node and at least two high pressure peaks. An intake port extends through the chamber and is located adjacent the low pressure node for drawing in a fluid into the chamber. A discharge port extends through the chamber and is located adjacent the high pressure peak for discharging fluid from the chamber.

36 Claims, 2 Drawing Sheets

THRUST PRODUCING APPARATUS

BACKGROUND OF THE INVENTION

1. Field of the Invention

This invention relates generally to devices for producing thrust for applications such as pumps, fans, and aircraft.

2. Description of the Prior Art

A variety of devices will produce thrust through a fluid for a variety of purposes. For example, in the case of vertical takeoff and landing aircraft, rotating blades provide downward thrust of one type. The blades may be on a helicopter or on a tiltwing aircraft. In another type, a jet engine has its exhaust deflected downward for producing a downward thrust to lift the plane. Thrust for forward flight is produced by propellers and jet engines. Generally airfoil surfaces having air passed over them due to the forward motion of the plane will provide the lift.

Other than an aircraft, thrust producing devices involving fluids include pumps, compressors, fans, and the like. All of these require moving parts, whether rotary, reciprocating, or the like.

SUMMARY OF THE INVENTION

In this invention, at precise sonic frequencies, thrust is provided in an apparatus which utilizes sound standing waves. The apparatus will have a chamber. A sound driver means, such as a speaker, will propagate a sound compression wave in the chamber and transmit it to a reflecting means. The interaction between the initial wave and the reflected wave produces a standing wave within the chamber. The node point(s) of the standing wave are the low pressure input points of the system. The high pressure points are at the end of the chamber and between the nodes. The high pressure points produce system thrust output. An intake port is provided in the chamber at a point adjacent to a low pressure at the node. This allows fluid, such as air, to be drawn into the chamber. A discharge port extends through the chamber on the opposite side from the intake port. The discharge port is directed transverse to the standing wave for discharging fluid. The pressure in the low pressure node area is less than the pressure in the high pressure peak. This results in fluid flowing in the intake ports and out the discharge ports. Thrust is produced in this manner.

In one embodiment, the chamber comprises a pump. The discharge ports will be connected to a conduit for pumping fluid drawn in through the intake port. In another embodiment, the apparatus is integrated with a helicopter blade. The chamber will be located within hollow portions of the blade. One end of the blade is fixed at a pivot point, while the other end will rotate about the pivot point. The intake and discharge ports are arranged to cause the rotation about the pivot point of the blade.

In another embodiment, the device comprises an aircraft. Preferably the chamber is a circular hollow disk with a central hole through it and a circular rim. A jet engine mounts to the chamber for directing an exhaust plume through the central hole perpendicular to the circular rim. The engine directs the exhaust plume through a circular array of pipes which are sized to provide a desired frequency to produce the standing waves. The sound waves propagate through the chamber and reflect back from the circular rim. The interaction between the initial wave and the reflected wave produces a standing wave within the chamber. The node point(s) of the standing wave are the low pressure input points of the system. The high pressure points are at the end of the chamber and between the nodes. The high pressure points produce system thrust output. Intake ports on the upper side are located in the low pressure node areas. Discharge ports on the lower side are located adjacent to the high pressure peaks. The apparatus provides an upward thrust in this manner. The jet engine can be inclined slightly relative to the axis of the chamber to create forward motion.

DETAILED DESCRIPTION OF THE INVENTION

Figure 1:
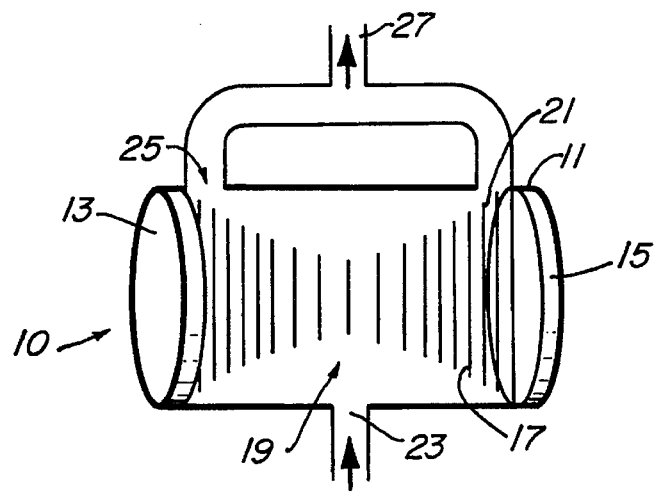
FIG. 1 is a schematic view illustrating a first embodiment of an apparatus constructed in accordance with this invention.

Referring to FIG. 1, device 10 may be used as a liquid pump or a compressor or fan. Device 10 has a chamber 11 with a cylindrical sidewall. Chamber 11 has ends which are perpendicular to the longitudinal axis of the cylinder. A sound driver 13 is mounted at one end and a sound driver 15 at the other end. In the case where the chamber 11 contains a gas, such as air, the sound drivers 13, 15 will be audio speakers. Each speaker 13, 15 is oriented facing the other for producing sound in a direction along the longitudinal axis of chamber 11. In the case where the chamber 11 contains a liquid, the speakers 13, 15 would be some type of sound emitting device for emitting sound in liquid.

The speakers 13, 15 are powered by an amplifier and tuned to the same frequency to achieve a standing wave. One of the speakers 13, 15 may be considered a sound source and the other a reflecting means for reflecting back the sound wave at a higher intensity. The amplitudes of the speakers 13, 15 are preferably the same also. In the embodiment shown, the standing wave is of a single harmonic. The frequency would be the speed of sound in the chamber 11 fluid divided by the length of chamber 11 from speaker 13 to speaker 15 and/or its harmonics. The standing wave produced will result in pressure lines 17 which are illustrated schematically. Each line 17 represents the magnitude of a pressure measurement that would be taken at that particular point along the longitudinal axis of the chamber 11. The lengths of the pressure lines 17 represent the magnitude of the pressure.

As can be seen, there is a low pressure node 19 in the center. Two high pressure peaks 21 are located on each end. The wave form is generally in a sinusoid. A lower pressure will thus exist in the center halfway between the speakers 13, 15 than on the ends of chamber 11. The difference in pressure depends upon the sound intensity level. A higher decibel can produce a difference between the pressure in the low pressure node area 19 and the high pressure peak areas 21 that is greater than a lower decibel level. For significant pressure differences, applicant seeks to approach sound levels of up to 200 decibels or more. These can result in a pressure difference between the high pressure area 21 and the low pressure area of approximately two times the ambient pressure in the high pressure area and nearly a vacuum in the low pressure area. Assuming an ambient pressure in chamber 11 that is the atmospheric pressure of 14.7 psi, the pressure in the high pressure peak area 21 would be approximately 28 or 29 psi.

To utilize this difference in pressure, an intake port 23 will be formed in the sidewall of chamber 11 in the low pressure node 19. In the embodiment shown, the intake port 23 will be at the midpoint between the speakers 13, 15. Intake port 23 will draw in ambient air, or if device 10 is used as a pump, will draw in liquid supplied from a tank or the like. The intake port 23 is located so as to draw in fluid in a flow direction that is perpendicular to the propogation of the standing wave.

A discharge port 25 will be located at each high pressure peak 21. The discharge ports 25 will be located at the maximum pressure level, which is at each high pressure peak 21. Preferably, each intake port 23 and discharge port 25 is generally rectangular having a narrow width and a longer length than width. Preferably, each port 23, 25 will extend circumferentially greater than the width. The discharge ports 25 discharge fluid perpendicular to a line normal to speakers 13, 15. This direction is perpendicular to the propogation of the standing wave.

In the embodiment shown, the discharge ports 25 are shown located 180 degrees around the sidewall of chamber 11 from the intake port 23. This orientation utilizes the pressure of discharge ports 25 to cause the chamber 11 to move in an opposite direction from the discharge out discharge ports 25. If device 10 is used as a pump, the chamber 11 would be fixed and the fluid would flow out the discharge ports 25 at a greater pressure than at the intake port 23. In that case, the discharge ports 25 would likely be connected to a conduit 27. If device 10 is used as a pump, the discharge ports 25 need not be 180 degrees from the intake port 23.

An actual example similar to the device in FIG. 1 was constructed. In the example, the chamber 11 was suspended horizontally on a pair of ropes or lines, one from each end, so that the chamber 11 would be horizontal and free to swing laterally. The discharge ports 25 were located in the sidewall of chamber 11, 180 degrees from the intake port 23. The ports 23, 25 were oriented horizontally. The chamber 11 was located in atmospheric air. Speakers 13, 15 were driven at in excess of 100 decibels. The frequency was about 94 hz. The diameter, which is not critical, was about 14 inches. The length was about three feet. Actual measurements showed that the sound caused the chamber 11 to move in a direction opposite from the direction of the discharge from the discharge ports 25. The amount of movement was approximately 15 degrees relative to the pivot points of the lines from which the chamber 11 was suspended.

Figure 2:
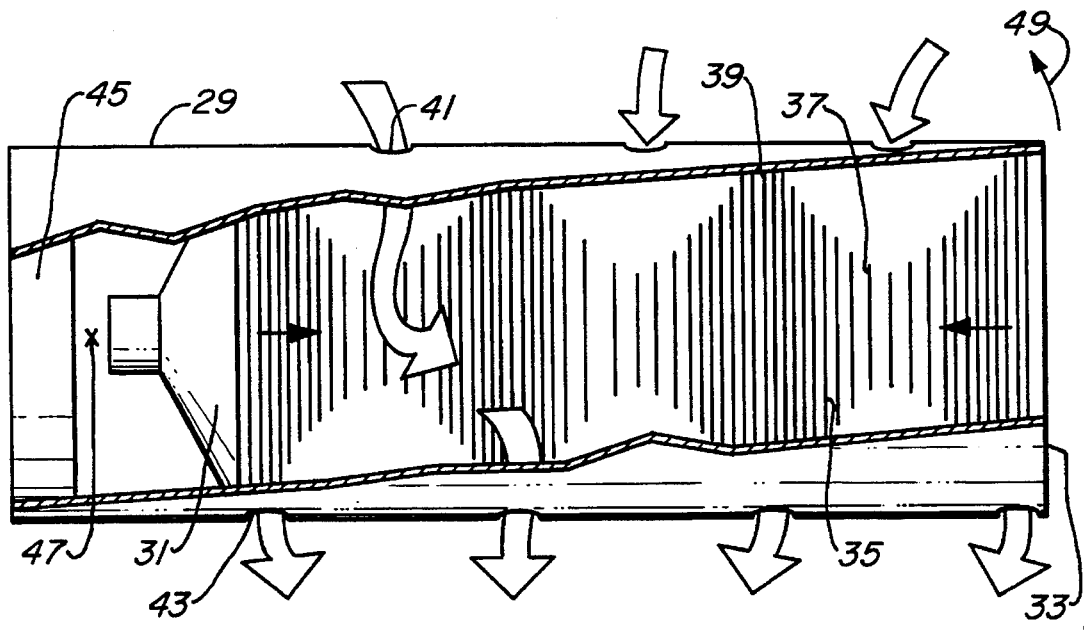
FIG. 2 is a schematic view illustrating a second embodiment constructed in accordance with this invention.

FIG. 2 illustrates the invention of FIG. 1 as applied to a helicopter blade. The chamber 29 extends at least partially along the length of and forms a part of a helicopter blade. A sound driver 31 will be located toward one end of chamber 29. A reflecting wall 33 will be located at the other end. The sound driver 31 is a speaker which, similar to the speakers 13, 15 of FIG. 1, can create a standing wave depending upon the frequency. While in FIG. 1, one of the speakers 13, 15 served as a reflecting means as well as an amplifier, in FIG. 2, a flat stationary wall 33 on the outer end serves as a reflecting means. Wall 33 is perpendicular to the longitudinal axis of chamber 29. Speaker 31 propagates a compression standing wave along the length of the chamber 29. Pressure lines 35 are the result, similar to the pressure lines 17 of FIG. 1. In the embodiment of FIG. 2, the frequency produces multiple harmonics, while FIG. 1 shows only a single harmonic. That is, there will be at least three low pressure nodes 37 and at least four high pressure peaks 39. This produces pressure differences between the low pressure nodes 37 and high pressure peaks 39 that depend upon the decibel level of the sound driver 31.

A plurality of intake ports 41 will be located on a side of chamber 29 that will be a leading edge of a helicopter blade. The intake ports 41 are located adjacent to the low pressure nodes 37. A plurality of discharge ports 43 are located on and opposite side of chamber 29. The discharge ports 43 are located adjacent to the high pressure peaks 39 and will be on a trailing edge of a helicopter blade.

The chamber 29 includes a counter weight 45 on its inner end. The chamber 29 will be mounted so that it will pivot about pivot point 47. As indicated by the arrows, thrust will be produced due to air flowing in the intake ports 41 and out the discharge ports 43. The chamber 29 will rotate about the pivot point 47 in the direction of arrow 49. The chamber 29 can be inserted as a relatively small portion along the tip of a conventional helicopter blade, or it could comprise substantially the entire blade. Lift would be produced by the blade, which spins due to the thrust produced by chamber 29.

Figure 3:
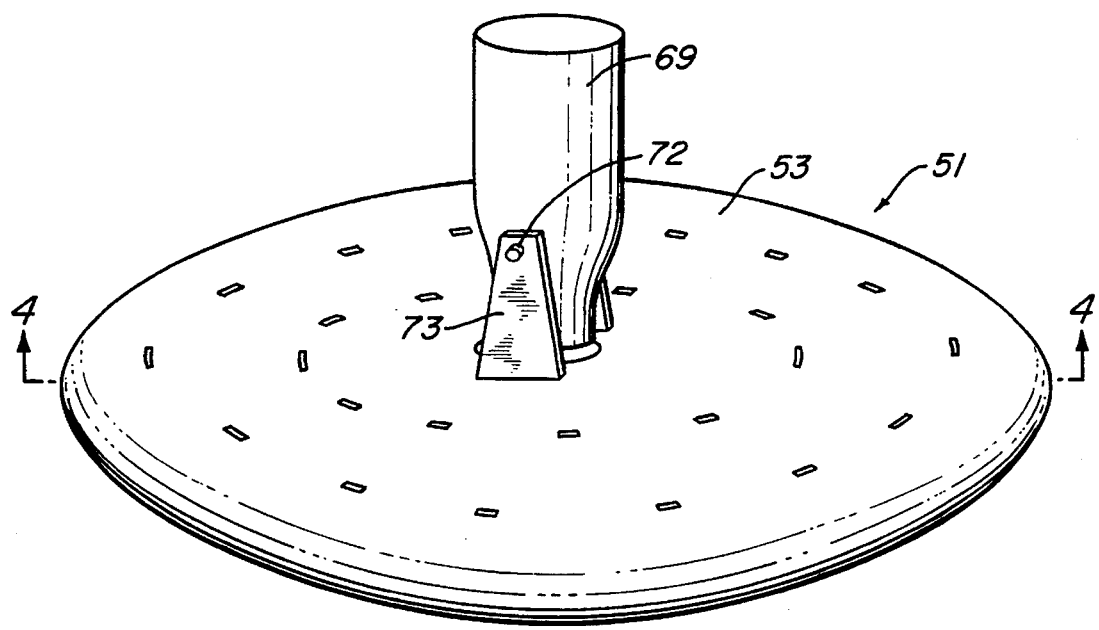
FIG. 3 is a perspective schematic view illustrating a third embodiment constructed in accordance with this invention.
Figure 4:
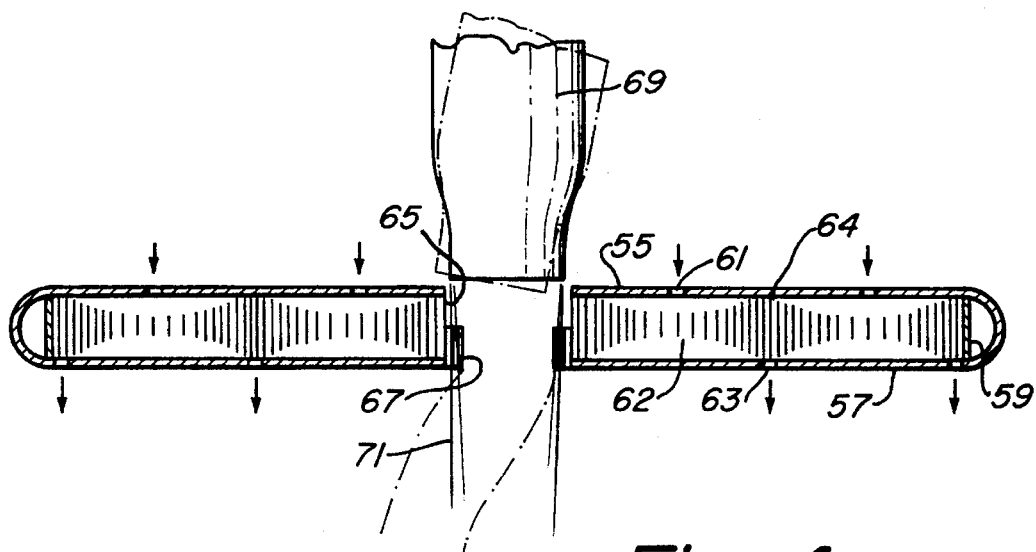
FIG. 4 is a sectional view of the third embodiment, taken along the line IV—IV of FIG. 3.

FIG. 3 illustrates an aircraft 51 having a general hollow circular disk configuration. Aircraft 51 has a chamber 53 that is annular. Chamber 53 has an upper side 55 and a lower side 57 (FIG. 4). Upper side 55 and lower side 57 are parallel to each other and perpendicular to the central axis of aircraft 51. As shown in FIG. 4, a reflecting wall 59 is mounted at the circular periphery of the chamber 53. Reflecting wall 59 is circular and parallel to the longitudinal axis of chamber 53. Reflecting wall 59 is also perpendicular to the upper and lower sides 55, 57.

A standing wave will be created within chamber 53, resulting in low pressure nodes 62 and high pressure peaks 64. Again, the number of nodes 62 and peaks 64 will depend upon the number of harmonics contained in the standing wave. A plurality of intake ports 61 are formed in the upper side 55. A plurality of discharge ports 63 are formed in the lower side adjacent the high pressure peaks 64. As illustrated in FIG. 3, the intake ports 61 are arcurate, having two curved, parallel side edges, and ends which are perpendicular to the side edges. The discharge ports 63 are preferably configured in the same fashion. The intake ports 61 and discharge ports 63 are oriented perpendicular to a line normal to reflecting wall 59.

Referring to FIG. 4, a central hole 65 extends through chamber 53 along the central axis. The chamber 53 is open to the central hole 65, allowing the communication of air into the chamber 53 from central hole 65. A plurality of tubes 67 are mounted around the central hole 65. The tubes 67 are considerably smaller in diameter than the central hole 65 and are located in a circumferential circular array. The tubes 67 each are mounted parallel to the central axis of the chamber 53. Tubes 67 have a length selected that is less than the distance from the lower side 57 to the upper side 55. The upper ends of the tubes 67 terminate below the upper side 55, and are shown in FIG. 4 to be terminating about halfway between the lower side 57 and the upper side 55.

A jet engine 69 is mounted to upper side 55, with its exhaust plume 71 facing downward to discharge exhaust through the central hole 65. Jet engine 69 is preferably of a conventional simple jet engine, such as the "buzz-bomb" missiles used by Germany in World War II. These engines are supplied with fuel pumped through a mechanical valving system. The fuel and air are compressed and ignited, creating thrust in the direction of exhaust plume 71 at a high decibel level.

The tubes 67 are arranged at the periphery of exhaust plume 71. Consequently, high speed gases flowing out exhaust plume 71 will discharge through the tubes 67. The tubes 67 modulate the plume 71 to create a sound wave with a frequency that will depend upon the lengths of the tubes 67. This frequency is tuned for the length of the chamber 53 from reflecting wall 59 to central hole 65. The tuning creates the standing wave referred to above.

Also, preferably the jet engine 69 will be mounted by pivot pins 72 on braces (FIG. 3) 73 that allow some pivotal movement. The pivotal movement is shown by dotted lines in FIG. 4. When pivoted slightly, some of the upward thrust from the exhaust plume 71 is directed laterally. This lateral direction will allow forward motion of the aircraft 51. The aircraft 51 will be capable of flight as a result of the combined thrust from the exhaust plume 71 and from the discharge of thrust out the discharge ports 63.

The invention has significant advantages. Thrust can be produced using high amplitude sound to create a standing wave in a chamber. The device has a number of flight applications such as in helicopter blades and in other vertical flight aircraft. The device can be used to produce air pressure cooling similar to a fan. The device can be used as a vacuum cleaner. The device can also be used as a compressor such as for refrigerator/heating systems. Also, rather than an aircraft, the device can be used as a hovercraft which reacts the discharge from the high pressure ports against the ground. The device could be used as a propulsion system for a submarine. In all cases, the device requires few moving parts, and could be of high efficiency.

While the invention has been shown in only three of its forms, it should be apparent to those skilled in the art that it is not so limited but is susceptible to various changes without departing from the scope of the invention.

I claim:

1. An apparatus for producing thrust, comprising in combination:

a chamber;

sound driver means for propagating a compression standing sound wave in the chamber, the sound wave having at least one low pressure node and at least one high pressure peak, the sound driver means producing a higher pressure in the chamber at the high pressure peak than at the low pressure node;

intake means including at least one intake port extending into the chamber at a point adjacent to the low pressure node for drawing in a fluid from exterior of the chamber; and discharge means including at least one discharge port extending into the chamber adjacent to the high pressure peak for discharging fluid from the chamber so as to create thrust.

2. The apparatus according to claim 1 wherein the sound driver means comprises:

a sound emitter positioned for emitting a sound wave at a selected frequency in the chamber; and means located in the chamber for reflecting the sound wave back to the sound emitter, so as to create the compression standing sound wave.

3. The apparatus according to claim 1, wherein the sound driver means comprises:

a sound emitter positioned for emitting a sound wave at a selected frequency in the chamber; and a reflecting wall located in the chamber opposite the sound emitter for reflecting the sound wave back to the sound emitter so as to create the compression standing sound wave.

4. The apparatus according to claim 1 wherein the sound driver means comprises:

a first sound emitter positioned in the chamber for emitting a sound wave at a selected frequency; and a second sound emitter located in the chamber opposite the first sound emitter for emitting a sound wave at the same frequency back to the first sound emitter so as to create the compression standing sound wave.

5. The apparatus according to claim 1 wherein the discharge port discharges fluid in a direction opposite to the drawing in of fluid at the intake port.

6. The apparatus according to claim 1 wherein:

there are at least two of the discharge ports and two of the intake ports; and there are at least two of the high pressure peaks and at least two of the low pressure nodes.

7. The apparatus according to claim 1 wherein:

the chamber is a cylinder having a cylindrical sidewall and two ends;

the sound driver means is located at one of the ends; and the discharge port and intake port are located in the cylindrical sidewall.

8. The apparatus according to claim 1 wherein:

the chamber is a cylinder having a cylindrical sidewall and two ends;

the sound driver means is located at one of the ends; and the intake port and the discharge port are located in the cylindrical sidewall, spaced 180 degrees apart from each other.

9. The apparatus according to claim 1 wherein:

the chamber is a circular hollow disk having a central axis, a circumferential rim, an upper wall and a lower wall spaced below the upper wall;

the intake port is located in the upper wall;

the discharge port is located in the lower wall; and the sound driver means comprises:

a sound emitter positioned on the axis of the chamber for emitting a sound wave at a selected frequency; and means located in the chamber at the rim for reflecting the sound wave back to the sound emitter so as to create the compression standing sound wave, the compression standing wave propagating in a 360 degree direction from the sound emitter.

10. The apparatus according to claim 1, wherein:

the fluid is a liquid; and the thrust is used to pump the liquid flowing through the chamber.

11. The apparatus according to claim 1, wherein:

the fluid is air which is at atmospheric pressure exterior to the chamber and which is discharged from the discharge port at an increased pressure over atmospheric, so as to create thrust to cause the chamber to move.

12. An apparatus for producing thrust, comprising in combination:

a chamber;

sound reflecting means in the chamber for reflecting sound waves;

sound emitter means cooperating with the sound reflecting means for propagating a compression standing sound wave in the chamber having at least one low pressure node and at least one high pressure peak, the sound reflecting means and the sound emitter means producing in the chamber a higher pressure at the high pressure peak than at the low pressure node;

intake means including at least one intake port extending into the chamber adjacent to the low pressure node for drawing air into the chamber; and discharge means including at least one discharge port extending into the chamber at a point for discharging air in a direction perpendicular to a line normal to the sound reflecting means, the discharge port being located adjacent the high pressure peak for creating thrust to move the chamber.

13. The apparatus according to claim 12 wherein the sound reflecting means is a stationary wall which faces the sound emitter.

14. The apparatus according to claim 12 wherein the sound reflecting means is a second sound emitter means mounted facing said first mentioned sound emitter means for emitting sound waves at the same frequency as said first mentioned sound emitter means.

15. The apparatus according to claim 12 wherein the sound reflecting means is a second sound emitter means mounted facing said first mentioned sound emitter means for emitting sound waves at the same frequency and substantially the same intensity as said first mentioned sound emitter means.

16. The apparatus according to claim 12 wherein:
the chamber is a cylinder having a cylindrical sidewall and two ends; and
the sound emitter means is located at one of the ends; and
the intake port and discharge port are located in the cylindrical sidewall, spaced 180 degrees apart from each other.

17. The apparatus according to claim 16 wherein the sound reflecting means is located at the other of the ends of the chamber and wherein the sound reflecting means is a second sound emitter means mounted facing said first mentioned sound emitter means for emitting sound waves at the same frequency as said first mentioned sound emitter means.

18. The apparatus according to claim 12, wherein:
the chamber is a circular hollow disk having a central axis and a circumferential rim, an upper wall, and a lower wall spaced below the upper wall;
the sound emitter means is positioned on the axis of the chamber;
the sound reflecting means is a circular wall located at the rim and extends circumferentially around the sound emitter means;
the intake port is located in the upper wall; and
the discharge port is located in the lower wall.

19. The apparatus according to claim 12 wherein the fluid is a liquid and wherein the thrust is used to pump the liquid flowing through the chamber.

20. The apparatus according to claim 12 wherein:
the fluid is air which is at atmospheric pressure exterior of the chamber and which is discharged from the discharge port at an increased pressure over atmospheric, so as to create thrust to cause the chamber to move.

21. An apparatus for producing thrust, comprising in combination:
a cylindrical chamber having a cylindrical sidewall and two ends mounted perpendicular to a longitudinal axis of the sidewall;
sound emitter means located at one of the ends for emitting a sound wave in the chamber;

sound reflecting means located at the other end of the chamber for reflecting the sound wave back to the sound emitter means so as to create a compression standing sound wave which propagates along the longitudinal axis of the chamber having at least one low pressure node and at least one high pressure peak, the sound emitter means and the sound reflecting means producing in the chamber a higher pressure at the high pressure peak than at the low pressure node;

intake means including at least one intake port extending through the sidewall of the chamber and located at a point adjacent the low pressure node for drawing in a fluid; and discharge means including at least one discharge port extending through the chamber adjacent the high pressure peak for discharging air so as to create thrust.

22. The apparatus according to claim 21 wherein the sound reflecting means comprises a reflecting wall mounted perpendicular to the longitudinal axis of the chamber.

23. The apparatus according to claim 21 wherein the sound reflecting means comprises a second sound emitter means mounted facing said first mentioned sound emitter means for emitting sound waves at the same frequency as said first mentioned sound emitter means.

24. The apparatus according to claim 21 wherein the intake port is located 180 degrees from the discharge port, so that the thrust produced by the discharge port serves to move the chamber.

25. The apparatus according to claim 21 wherein the fluid is a liquid and wherein the thrust is used to pump the liquid flowing through the chamber.

26. An aircraft comprising in combination:
a chamber having the configuration of a circular hollow disk with a central axis, a circumferential rim, an upper wall, and a lower wall spaced below the upper wall;
a sound emitter positioned in the chamber on the central axis for emitting a sound wave in the chamber at a selected frequency;
a reflecting wall located in the chamber at the rim for reflecting the sound wave back to the sound emitter so as to create in cooperation with the sound emitter a compression standing sound wave propagating in a 360 degree direction from the sound emitter, the compression standing sound wave having at least one low pressure node and at least two high pressure peaks, the sound emitter and reflecting wall producing in the chamber a higher pressure at the high pressure peaks than at the low pressure node;
intake means including a plurality of intake ports positioned circumferentially around the central axis in the upper wall for drawing in air, the intake ports being located at the low pressure node; and
discharge means including a plurality of discharge ports positioned circumferentially around the central axis through the lower wall of the chamber for discharging air, each of the discharge ports being located adjacent one of the high pressure peaks for discharging air so as to create an upward thrust to cause the aircraft to fly.

27. The apparatus according to claim 26 wherein the sound emitter comprises:
a central hole extending through the chamber along the central axis;
a jet engine mounted to the chamber for directing an exhaust plume downward through the central hole; and
modulating means in the central hole for producing the selected frequency from the exhaust plume.

28. The apparatus according to claim 26 wherein the reflecting wall is a cylinder having an axis that coincides with the longitudinal axis of the chamber.

29. The apparatus according to claim 27 wherein the modulating means comprises a plurality of tubes located in the circular hole, each of the tubes being parallel to the longitudinal axis of the chamber, the tubes being positioned in a circumferential array for receiving some of the discharge of the exhaust plume of the jet engine, the tubes being sized so as to modulate the sound produced by the jet engine exhaust plume to produce the selected frequency.

30. The apparatus according to claim 27, further comprising pivotal means for pivoting the engine about the central axis of the chamber for selectively producing a forward thrust component as well as an upward thrust component.

31. An aircraft, comprising in combination:

a circular, hollow chamber having a central hole along a central axis, a circumferential rim, an upper wall, and a lower wall spaced below the upper wall;

a jet engine mounted to the chamber at the upper wall, the jet engine being adapted to discharge an exhaust plume through the central hole of the chamber;

modulating means for modulating the sound produced by the exhaust plume to create sound waves in the chamber having a selected frequency;

a cylindrical sound reflecting means located at the rim of the chamber for reflecting back sound waves emanating from the exhaust plume to create areas of high and low pressure within the chamber, the areas of high pressure being of a higher pressure than the areas of low pressure;

intake means including a plurality of intake ports located in the upper wall of the chamber and positioned adjacent the areas of low pressure within the chamber for drawing in air; and discharge means including a plurality of discharge ports located in the lower wall of the chamber and positioned adjacent the areas of high pressure within the chamber for discharging air from the chamber, the discharge creating a thrust to assist in lifting the aircraft to cause the aircraft to fly.

32. The apparatus according to claim 31, further comprising:

pivotal means for pivoting the jet engine about the central axis of the chamber so as to create a forward component of thrust for causing the aircraft to move in a forward direction.

33. The apparatus according to claim 31 wherein the modulating means comprises a plurality of tubes located in the circular hole, each of the tubes being parallel to the longitudinal axis of the chamber, the tubes being positioned in a circumferential array for receiving some of the discharge of the exhaust plume of the jet engine, the tubes being sized so as to modulate the sound produced by the jet engine exhaust plume to produce the selected frequency.

34. A method for producing thrust, comprising:

providing a chamber;

propagating a compression standing sound wave in the chamber so as to create at least one low pressure node and at least one high pressure peak within the chamber, with the pressure in the chamber at the high pressure peak being greater than the pressure at the low pressure node;

providing an intake port extending into the chamber at a point adjacent the low pressure node, and drawing fluid in through the intake port due to the low pressure node; and providing a discharge port extending into the chamber adjacent the high pressure peak, and discharging air from the chamber through the discharge port as a result of the high pressure peak so as to create thrust.

35. The method according to claim 34, further comprising positioning the intake port so as to draw air in a direction opposite to the direction air is discharged from the discharge port so as to create thrust to move the chamber.

36. The method according to claim 34, further comprising connecting the intake port to a source of liquid and pumping liquid through the chamber from the intake port out the discharge port.

* * * * *